3 Sheets—Sheet 1.
A. H. PETSCH.
DUMPING CAR.
No. 11,441. Patented Aug. 1, 1854.
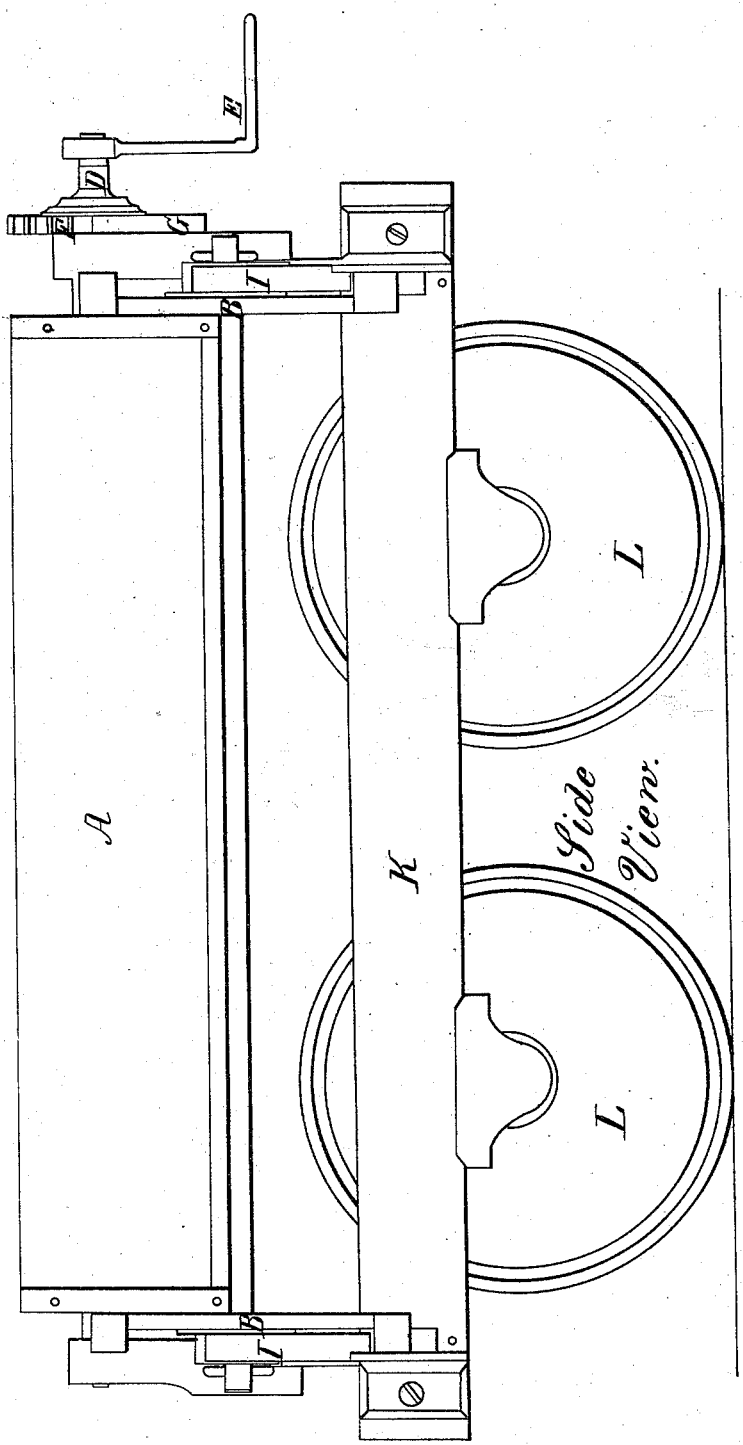

A. H. PETSCH.
DUMPING CAR.
No. 11,441. Patented Aug. 1, 1854.
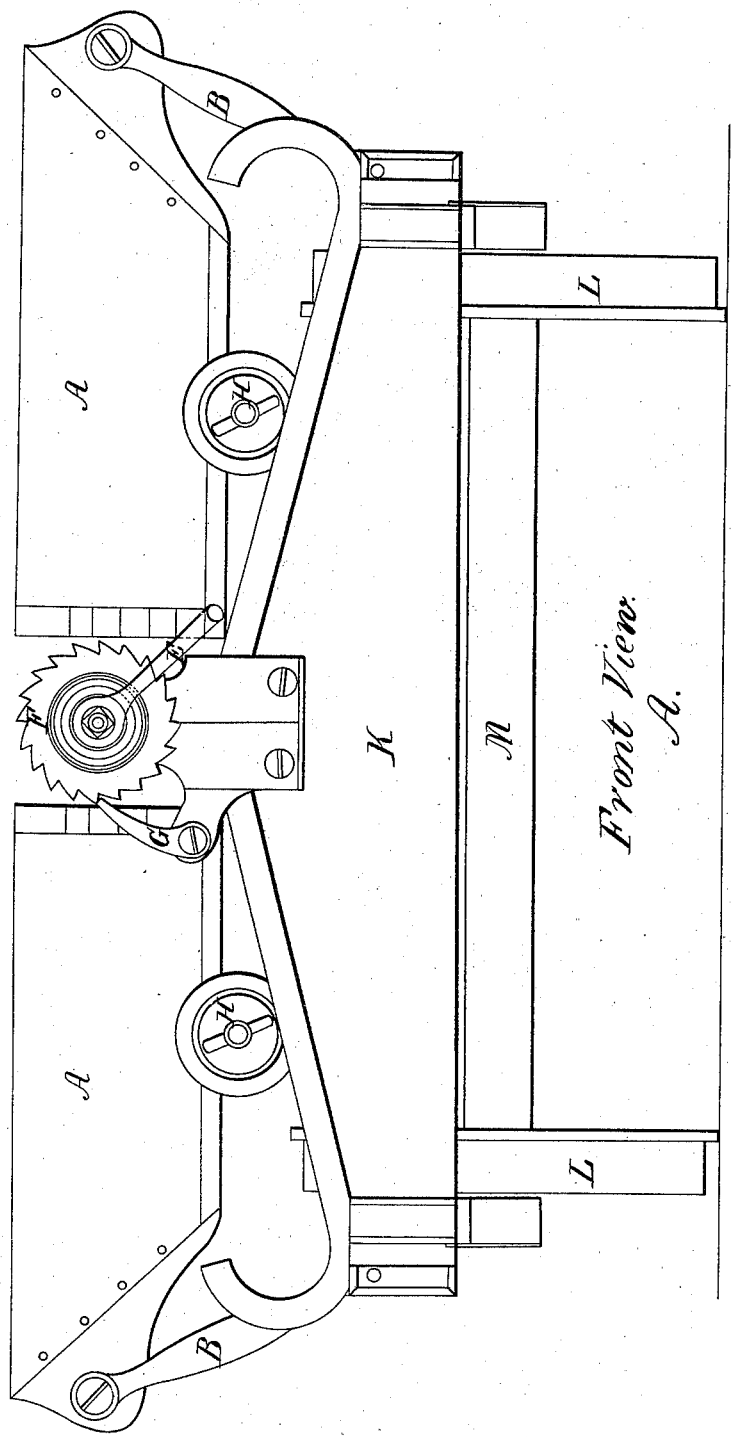

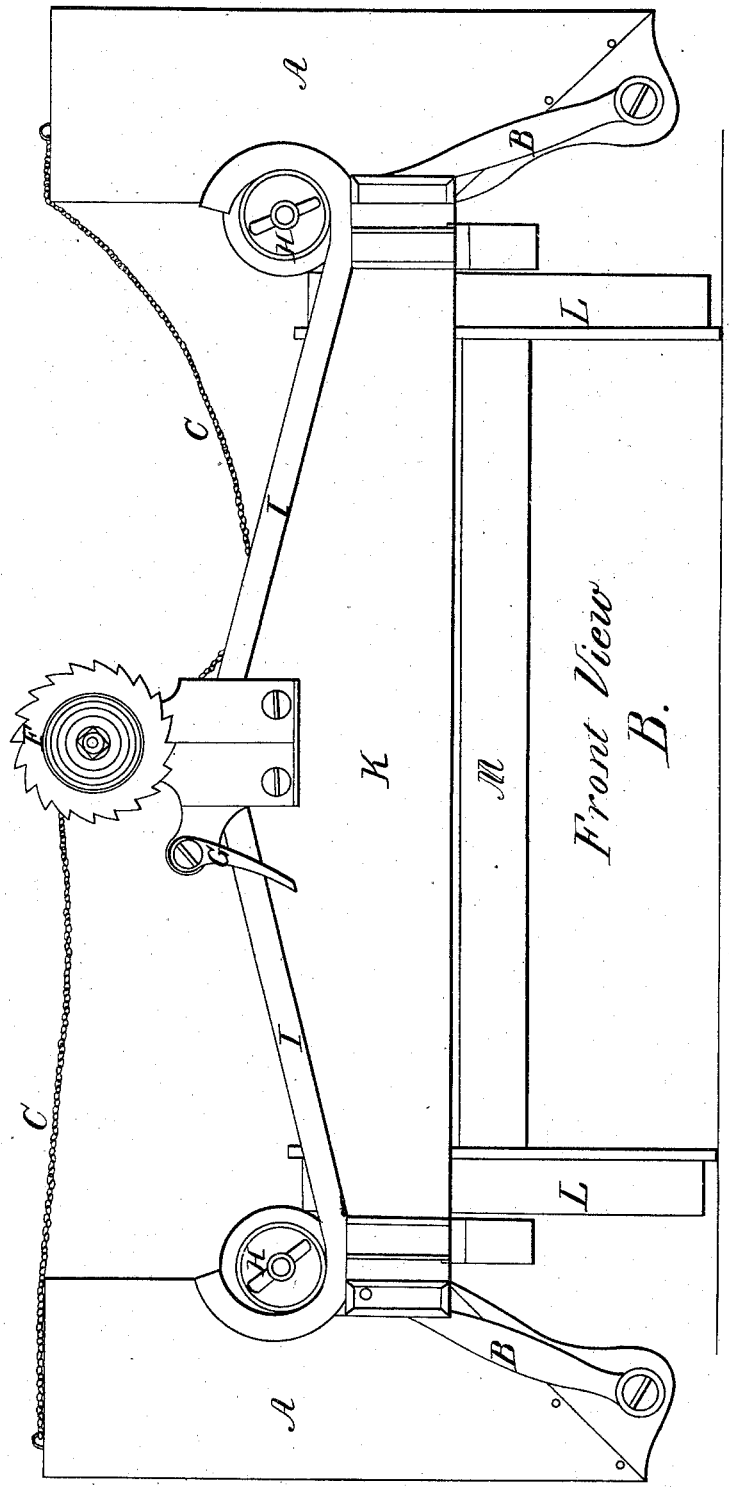

UNITED STATES PATENT OFFICE.

ALEXANDER H. PETSCH, OF CHARLESTON, SOUTH CAROLINA.

DUMPING-CAR.

Specification of Letters Patent No. 11,441, dated August 1, 1854.

*To all whom it may concern:*

Be it known that I, ALEX. H. PETSCH, of Charleston, State of South Carolina, have invented a new and useful Improvement in Dumping-Cars; and I do hereby declare that the following is a full, clear, and exact description of the construction and operation of the same.

I construct the frame of a dumping car as they are usually constructed. I then attach an inclined plane made of bars with curved ends, projecting over frame of car. I use one or two boxes to which are attached small railroad wheels for running on above plane, the curved ends holding wheels when the box or boxes are dumped. I also use a shaft with chain pulleys to bring the boxes back after being dumped, by means of a crank and chain attached to pulleys and shaft. I use the joints, ratchet-wheel and pawl for holding the boxes in a level position while loading, as reference to accompanying drawings will more fully show.

Figure 1, side elevation with boxes ready for loading; Fig. 2, side elevation with boxes dumped; Fig. 3, end elevation.

A, the boxes in Fig. 1 ready for loading. A, the boxes in Fig. 2, have run down an inclined plane, have been stopped by curved rail, have dumped themselves at an angle sufficient to discharge their entire contents. B, the joints for guiding the boxes on rails and keeping them in a level position, as at Fig. 1, at A; C, the chains working over chain pulleys on the shaft D, to bring the boxes back to their original position, as at A, Fig. 1, by means of crank E; F, the ratchet wheel, and, G, the pawl for keeping the boxes in their position while loading; H, small railroad wheels attached to boxes for rolling them down inclined plane; I, the rail projecting over frame of car, the diameter of wheel or more if required, to dump the boxes at an angle of ninety or more degrees from their position at A, in Fig. 1; K, the frame of car; L, the wheels, and M the axle, &c.

The advantage I gain by my invention over the plans heretofore used is by detaching pawl from ratchet wheel the boxes run down the inclined plane by their own gravity and dump themselves at such an angle, by projection of rail, as to discharge all their contents, whatever it may be, thereby saving labor to the operator, he only having to bring the empty boxes back by means of the crank.

I do not claim the dumping of cars laterally across or on the side of the road, for that has been long practiced, nor do I claim the two boxes on one carriage to dump on either side of the road, as that is also in use; but What I do claim and desire to secure by Letters Patent, is—

1. The construction of railways laterally across the carriage, or otherwise, by which means I am enabled to dump the boxes by their own gravity, when let go from the apex of the plane, without labor to the operator, substantially as set forth in the above specification.

2. I also claim the projection of the railway beyond and outside of car carriage, by which means I am enabled to dump the boxes at such an angle as to discharge their contents whatever may be the character of the load.

ALEXANDER H. PETSCH.

Test:
W. H. GODDARD,
M. ASHFORD.